US007956316B2

United States Patent
Browning, Jr. et al.

(10) Patent No.: US 7,956,316 B2
(45) Date of Patent: *Jun. 7, 2011

(54) FIBER OPTIC SECURITY SYSTEM FOR SENSING THE INTRUSION OF SECURED LOCATIONS

(75) Inventors: Thomas E. Browning, Jr., Spartanburg, SC (US); Mark C. Phillips, Woodruff, SC (US)

(73) Assignee: Woven Electronics, LLC, Greenville, SC (US)

( * ) Notice: Subject to any disclaimer, the term of this patent is extended or adjusted under 35 U.S.C. 154(b) by 203 days.

This patent is subject to a terminal disclaimer.

(21) Appl. No.: 12/321,644

(22) Filed: Jan. 23, 2009

(65) Prior Publication Data

US 2009/0201153 A1    Aug. 13, 2009

Related U.S. Application Data

(63) Continuation of application No. 10/429,602, filed on May 5, 2003, now abandoned.

(60) Provisional application No. 60/456,687, filed on Mar. 21, 2003.

(51) Int. Cl.
*H01J 40/14* (2006.01)
(52) U.S. Cl. .................. 250/221; 250/227.14
(58) Field of Classification Search .......... 250/221, 250/222.2, 227.14, 227.15, 559.4; 340/555–557; 73/768, 789, 803, 804
See application file for complete search history.

(56) References Cited

U.S. PATENT DOCUMENTS

| | | | |
|---|---|---|---|
| 4,217,488 A | 8/1980 | Hubbard |
| 4,369,437 A | 1/1983 | Thompson, Jr. et al. |
| 4,447,123 A | 5/1984 | Page et al. |
| 4,777,476 A | 10/1988 | Dank |
| 4,814,562 A | 3/1989 | Langston |
| 4,829,286 A | 5/1989 | Zvi |
| 5,049,855 A | 9/1991 | Slemon et al. |
| 5,055,827 A | 10/1991 | Philipp |
| 5,434,557 A | 7/1995 | Alizi |

(Continued)

FOREIGN PATENT DOCUMENTS

GB    2 098 770 A    11/1982

(Continued)

*Primary Examiner* — Que T Le
(74) *Attorney, Agent, or Firm* — Cort Flint (57) ABSTRACT

A sensor for a security system is disclosed to detect intrusions at one or more predetermined locations wherein each location includes a moveable member which must be moved in order to intrude the location. The system includes a fiber network routed in close proximity to one or more locations. The sensor comprises a sensor housing for being disposed at a location to detect a predetermined movement of the moveable member from a secure position to an unsecured position, and means for mounting the sensor housing in a stationary position at the location without a physical connection to the moveable member. The sensor housing includes a fiber inlet and a fiber outlet, and a fiber chamber for receiving a predetermined sensor fiber of the fiber network being routed through the sensor housing. The sensor has a sensor actuator for engaging the sensor fiber to generate an intrusion signal upon detecting predetermined movement of the moveable member, and causing the intrusion signal to be transmitted along the sensor fiber to a processor whereby the intrusion and location of the intrusion may be determined by the processor. Preferably, the sensor includes a magnetic actuator having a magnetic attraction to the moveable members whose interruption causes activation of the sensor and generation of the intrusion signal.

34 Claims, 8 Drawing Sheets

U.S. PATENT DOCUMENTS

| | | | |
|---|---|---|---|
| 5,450,888 A | * | 9/1995 | Schwartzman et al. ........ 160/10 |
| 5,592,149 A | | 1/1997 | Alizi |
| 5,594,239 A | | 1/1997 | Lessing |
| 5,790,285 A | | 8/1998 | Mock |
| 6,002,501 A | | 12/1999 | Smith et al. |
| 6,236,789 B1 | | 5/2001 | Fitz |
| 6,559,437 B1 | | 5/2003 | Pope, Jr. et al. |
| 6,980,108 B1 | | 12/2005 | Gebbia et al. |
| 2004/0233054 A1 | | 11/2004 | Neff et al. |
| 2005/0196238 A1 | | 9/2005 | DeGreef |

FOREIGN PATENT DOCUMENTS

| | | |
|---|---|---|
| GB | 2 247 095 A | 2/1992 |
| WO | WO 2006/052777 | 5/2006 |

* cited by examiner

FIBER OPTIC SECURITY SYSTEM FOR SENSING THE INTRUSION OF SECURED LOCATIONS

BACKGROUND OF THE INVENTION

This invention relates to a fiber optic security system and sensor for detecting the intrusion of a secured location and, more particularly, to such a system and sensor wherein each secured location includes a moveable member which secures the location and a fiber optic network routed in close proximity to the location wherein the sensor senses movement of the moveable member to an unsecured position, and the system detects the occurrence and location of the intrusion.

With the increase in terrorist events needed to be prevented in the United States, the need for effective security systems to sense intrusion into secured areas has greatly increased. In particular, a security system for the protection of a vast system of underground utilities accessed by manholes with removeable covers is needed. A highly effective system to detect entrance into these underground spaces and utilities is needed in order to protect against vandalization and terrorist activities within these spaces and the spaces to which these underground utilities lead. Heretofore, it has been known to use fiber optic sensors to detect theft of articles, intrusion into protected areas, as well as a variety of other purposes.

For example, U.S. Pat. No. 4,369,437 discloses a security and alarm apparatus to detect movement of a cover for a fill pipe leading to an underground fuel tank wherein an alarm signal is transmitted if the cover is disturbed. However, the system does not use fiber optics, requires electrical power at the location, and is generally not suited for a wide area security system.

U.S. Pat. No. 5,055,827 discloses an fiber optic security system to prevent the theft of appliances located in a network of computers, terminals, and associated peripheral devices. When one of the appliances is moved, light attenuation of a fiber cable results in a signal being generated. However, this system requires physical connection of the optic fiber to the appliance and the system is not suitable for detecting events in a wide geographical area.

U.S. Pat. No. 5,434,557 discloses an intrusion detection system having at least one optical cable which is usually part of a fence. When the intruder exerts force on the fence, the movement actuates a mechanical device exerting force on the cable which is detected and actuates an alarm. Here again, the system requires physical connection to the moveable part of the fence and the fiber optic cable requires electrical power at the location, and is generally not suitable for wide geographical areas.

U.S. Pat. No. 5,594,239 discloses a measuring system for monitoring buildings, train sections, or the like, consisting of a beam wave guide bending sensor. Basically, the system utilizes the deflection of a beam wave length to detect movement of the building structure.

U.S. Pat. No. 4,814,562 discloses a pressure sensor which utilizes pressure on a fiber optic in order to measure pressure.

U.S. Pat. No. 5,592,149 discloses a security fence which utilized an optical wire woven into the fence material whereupon movement of the fencing by an intruder causes the fiber wire to move and actuate an alarm signal. Once again physical connection is required between the optic fiber and the moveable member. U.S. Pat. No. 4,777,476 discloses another security fence wherein the optic fiber is physically connected to the moveable member to detect movement of a moveable member and intrusion to generate an alarm. U.S. Pat. No. 4,829,286 discloses yet another security fence requiring physical connection of the optic fiber to a moveable member in order to generate a signal caused by an intruder moving the fiber optic. U.S. Pat. No. 5,049,855 discloses a security screen system wherein an optical fiber is woven into the screen mesh and distortion of the screen material by an intruder causes an alarm signal.

Not only do the above security systems and sensors require a physical connection between the optic fiber and the moveable member, but the systems require electrical power at the location sought to be protected making them wholly unsuitable for many security applications, including wide geographical area systems. More importantly, no provision is made for identifying the location of an intrusion event where large numbers of sensors are utilized.

Accordingly, an object of the present invention is to provide a security system for detecting intrusion at a secured location using a fiber optic network and sensor by which the occurrence and location of an intrusion even can be reliably determined.

Another object of the present invention is to provide a security system for detecting an intrusion at any one of a plurality of secured locations using an fiber optic network in close proximity to the locations wherein the actuation of a sensor by an intruder and the exact location of the sensor and the intrusion can be determined at any one of the locations.

Another object of the present invention is to provide a sensor for a security system which can be utilized with an fiber optic network requiring no electrical power and requiring no physical connection to a moveable member having a secured position in order to detect movement of the moveable member to an unsecured position.

Yet another object of the invention is to provide a security system using a pre-existing fiber optic network which carries voice and/or data transmissions wherein a fiber of the network may be connected to a series of sensors and to an optical reflectometer so that the occurrence and location of an intrusion may be determined.

SUMMARY OF THE INVENTION

The above objectives are accomplished according to the present invention by providing a security system for detecting intrusion at a plurality of predetermined locations using a fiber network composed of a plurality of optic fibers routed in close proximity to the locations. The system comprises sensors disposed at the locations contacting an optic fiber from the fiber network selected as a sensor fiber for detecting physical intrusions at the locations and generating intrusion signals when one or more sensors are activated. A processor in communication with the sensor fiber receives the intrusion signals from the activated sensors and determines the location of each activated sensor. A communication output is operatively associated with the processor for communicating identification of each activated sensor and the location of each activated sensor. Preferably, the locations include a moveable member which must be moved in order to intrude into the location, and the sensors are disposed adjacent to the moveable members in a non-contacting manner. The sensors detect a predetermined movement of the moveable members from a secured position to an unsecured position whereby intrusion signals are generated without physical connection between the sensors and the moveable members. Advantageously, the sensors may include magnetic attractions between the sensors and the moveable members whose interruption causes activation of the sensors and generation of the intrusion signals. In the illustrated embodiment, the sensors include a reciprocating sensor actuator having a deactivated position and an activated position. The sensor actuator engages the sensor fiber when the moveable members are in an unsecured position causing sensor activation and the intrusion signal to be generated. The moveable sensor actuator forms a predetermined bend in the sensor fiber when activated to produce a characteristic intrusion signal that is readily recognizable by the processor to reliably detect a sensor activation and sensor location. In an advantageous aspect, the sensor actuator includes a first contoured abutment with a prescribed contour for engaging the sensor fiber, producing a predetermined bend in the sensor fiber upon activation of the sensor. In the illustrated embodiment, the sensor includes a sensor housing having a fiber chamber. The sensor fiber is routed through the fiber chamber with a natural bend producing no attenuation in the sensor fiber when the sensor is deactivated. The sensor actuator engages the natural bend of the sensor fiber to form the predetermined bend in the sensor fiber when the sensor is activated causing the characteristic attenuation in the sensor fiber and generation of the intrusion signal. The fiber chamber includes a fiber receiving space defined between the first contoured abutment of the sensor actuator and a second contoured abutment through which the sensor fiber passes. The second contoured abutment engages the sensor fiber to produce the natural bend when the sensor is deactivated, and the first contoured abutment engages the sensor fiber to produce the predetermined bend when the sensor is activated. Preferably, the first and second contoured abutments are carried by the movable actuator. A biasing element connected between the movable actuator and the sensor housing forces the first contoured abutment to engage the sensor fiber when the sensor is activated. The sensor housing includes a fiber inlet and a fiber outlet so that the sensor fiber is routed through the inlet, through the fiber chamber where the sensor fiber assumes the natural bend, and through the fiber outlet.

In accordance with a method for detecting intrusion into a protected location using a fiber network connected to an optical reflectometer processor, the method comprises providing a sensor for detecting a predetermined movement of a moveable member which must be moved in order to intrude into the location. Next; a connection between a fiber of the fiber network and the sensor is made so that a predetermined movement of the moveable member causes the sensor to be activated and to generate an intrusion signal which is transmitted to the reflectometer device through the fiber. Next, the method includes processing the intrusion signal to determine the location of the sensor and hense, the intrusion. Advantageously, the method includes using existing utility fiber networks which carry voice and data signals, and providing connection to a fiber of the fiber network as a sensor fiber for generating and transmitting the intrusion signal. The connection between the fiber and the sensor is made without making a physical connection between the fiber and the moveable member. The method includes providing a sensor having a moveable actuator which contacts the fiber causing generation of the intrusion signal in response to movement of the moveable member to the unsecured position; and providing a magnetic attraction between the moveable actuator and the moveable member which is broken when the moveable member is moved to an unsecured position. Advantageously, the method includes arranging the fiber to have a natural bend producing generally no attenuation when said sensor is deactivated, and deforming said natural bend to a predetermined bend when the sensor is activated to generate the intrusion signal having a discernible characteristic wave form resulting from the bend.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now to the drawings, the invention will now be described in more detail.

Figure 1:
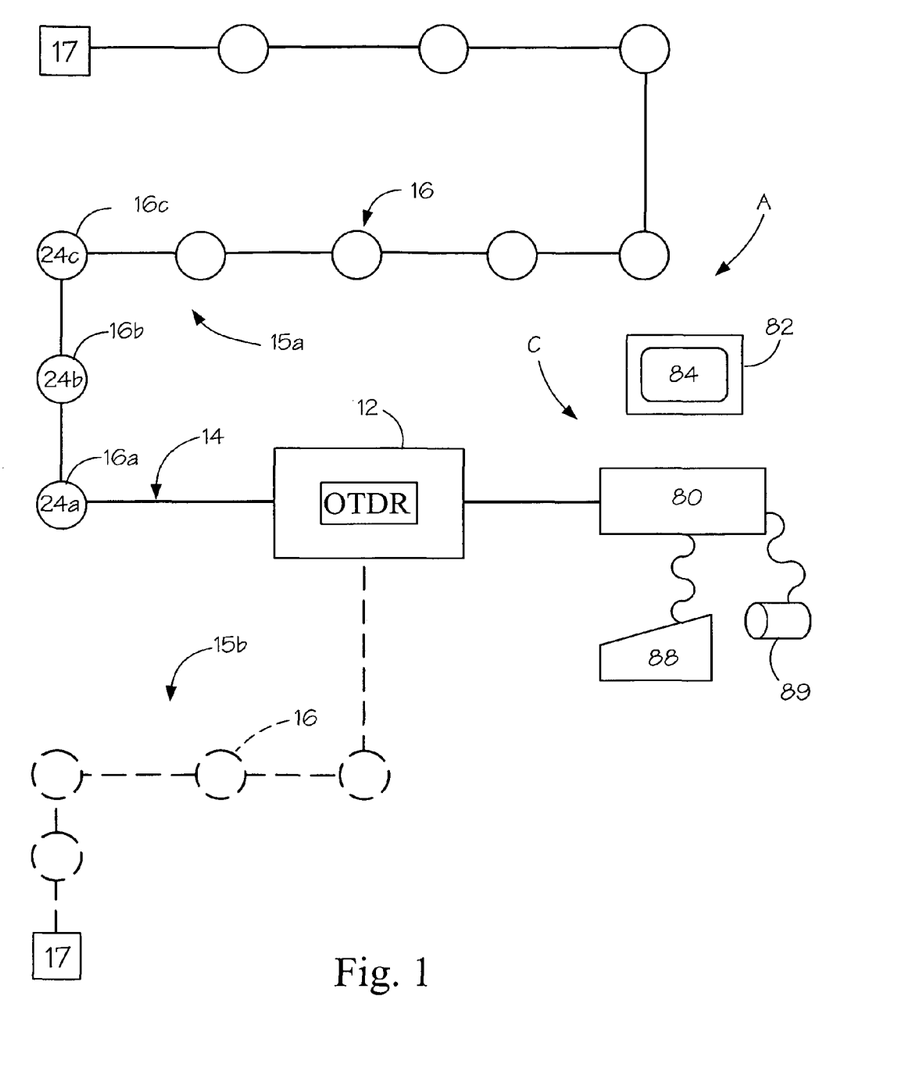
FIG. 1 is a schematic diagram illustrating one embodiment of a security system according to the invention employing fiber optic networks wherein a plurality of intrusion sensors are connected in series in the networks and wherein the networks includes an optical time domain reflectometer (OTDR)

As can best be seen in FIG. 1, an optical fiber security system, designated generally as A, is illustrated. The security system includes a remote processor, designated generally as 10, for processing an intrusion signal to determine the occurrence and location of the intrusion. The processor may, for example, include an optical time domain reflectometer (OTDR) 12 of the type routinely utilized to monitor maintenance of fiber optic network systems. Typically, the OTDR is used to sense a fiber breakage, water seepage, irregular bends, or other defects in one or more optical fibers of the fiber network along the routing path of the network. For example, in large municipalities it is not uncommon for there to be 1,000 miles of fibers in an optical fiber network. However, as opposed to these conventional uses, an expedient of the present invention is to utilize the OTDR to detect the occurrence and exact location of an individual attempting an intrusion into a secured location. In the illustrated embodiment of FIG. 1, the OTDR is connected to two fiber optic networks 15a and 15b. Each network includes a plurality of secured locations comprised of a series of utility manholes 16. A transponder 17 may be located at the end of each fiber optic network. The manholes include manhole manifolds 18, and manifold covers 20 which cover and secure the manholes. For purposes of illustration, and not limitation, three manholes 16a, 16b, and 16c of network 15a will be discussed to illustrate the invention. Of course, any number of manholes as are disposed in close proximity to the fiber optic network may be placed in series in the security system. Typically, fiber optic networks run through the underground tunnels to which access is provided through the manholes. Of course, many other type of utility cables, channels, water and sewage are typically routed through the underground tunnels.

Figure 2:
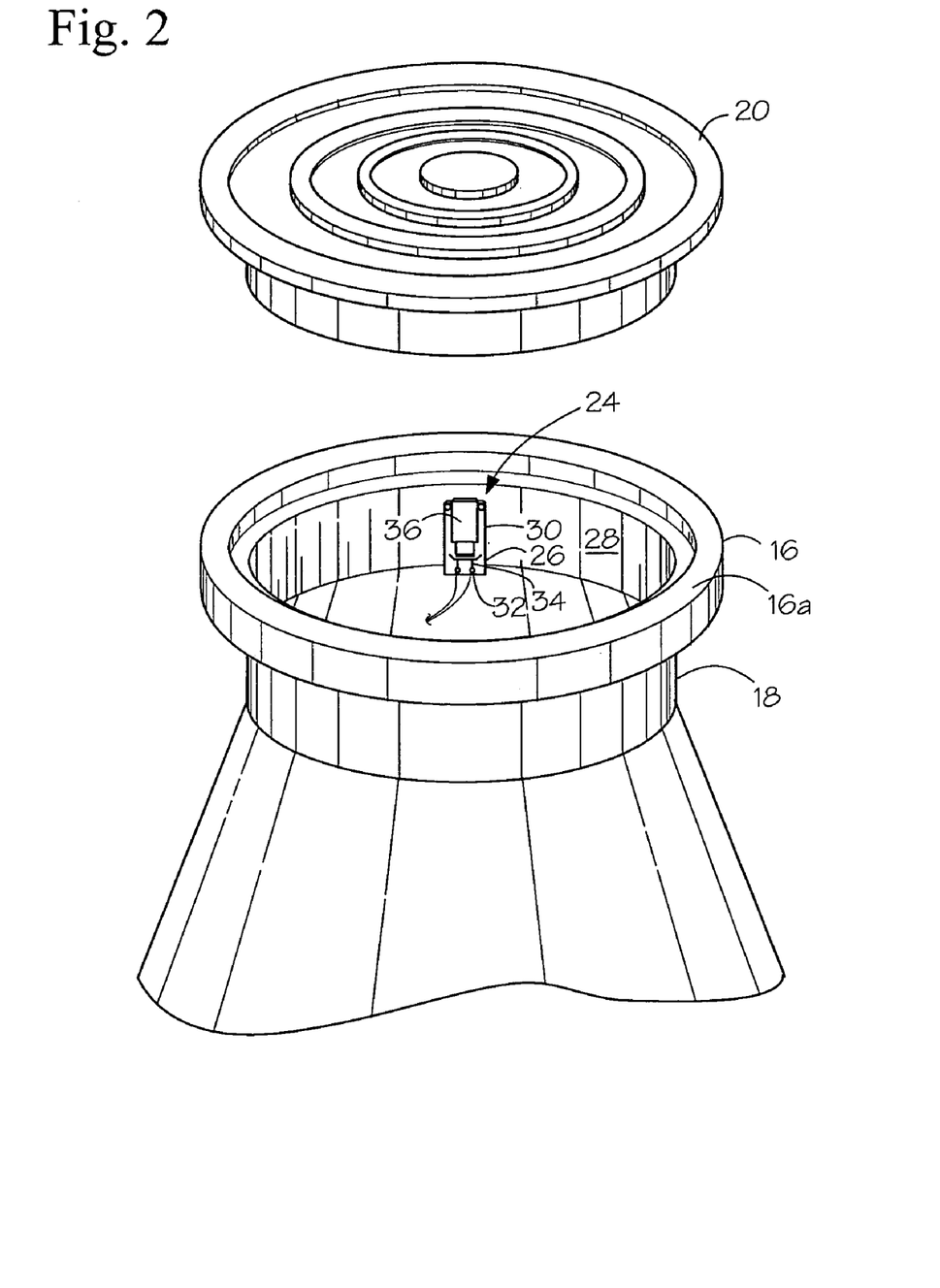
FIG. 2 is perspective view of an optic intrusion sensor according to the invention mounted to a manifold of a manhole to detect the removal of the manhole cover wherein the cover is shown in a secured position.
Figure 3A:
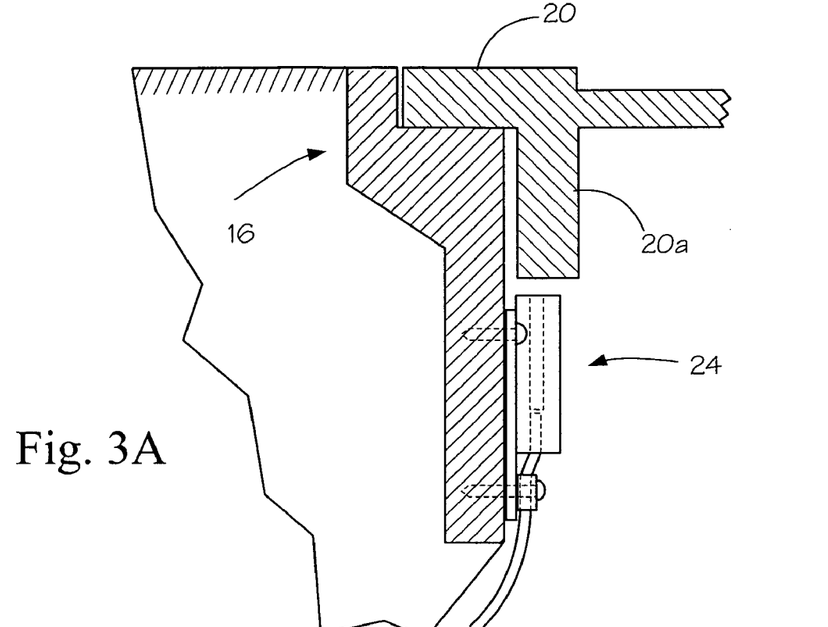
FIG. 3A is a section view of an optic intrusion sensor according to the invention mounted to a manifold of a manhole to detect the removal of the manhole cover wherein the cover is shown in a secured position which activates the sensor.
Figure 3B:
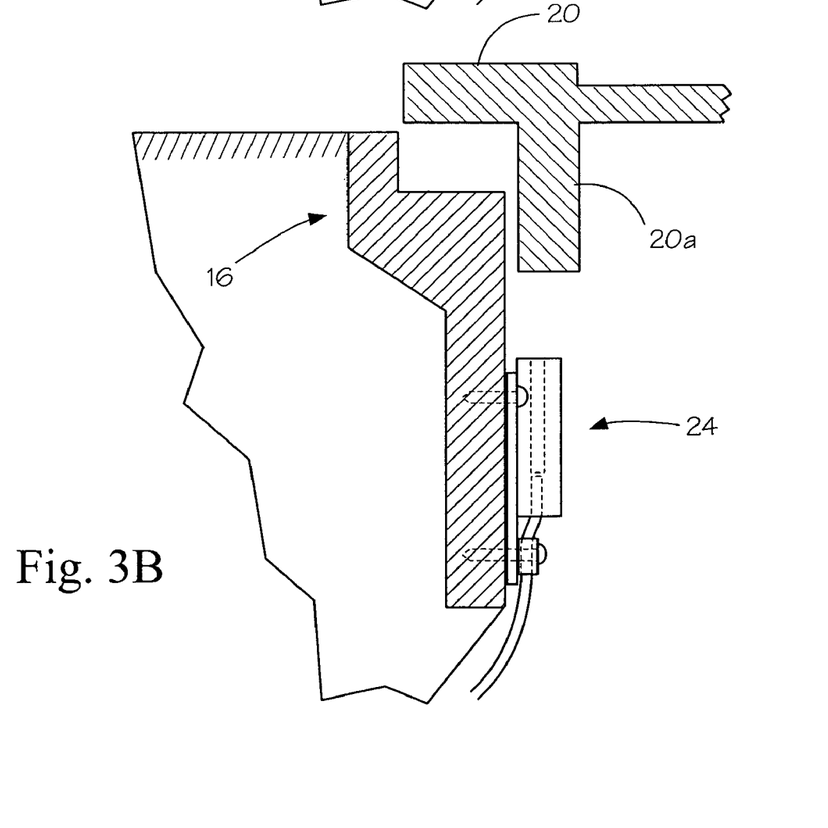
FIG. 3B is a section view of an optic intrusion sensor according to the invention mounted to a manifold of a manhole to detect the removal of the manhole cover wherein the cover is shown in an unsecured position which activates the sensor.

As can best be seen in FIGS. 2, 3A, and 3B, a sensor, designated generally as 24, is attached in a stationary position by means of an adjustable bracket 26 to an interior sidewall 28 of each manifold. Each sensor includes a sensor housing 30 attached to mounting bracket 26 which, in turn, is mounted to interior sidewall 28 by means of conventional fasteners 32 extending through adjustable slots 34 of bracket 26. In this manner, the vertical position of sensor 24 can be adjusted relative to a top flange 20a of manhole cover 20 so as to be mounted out of contact but closely adjacent to the flange of the manhole cover, for reasons explained more fully below.

FIG. 3A shows the manhole cover in a secured position wherein the sensor is deactivated. FIG. 3B shows the manhole cover moved to an unsecured position wherein the sensor is activated.

Figure 4A:
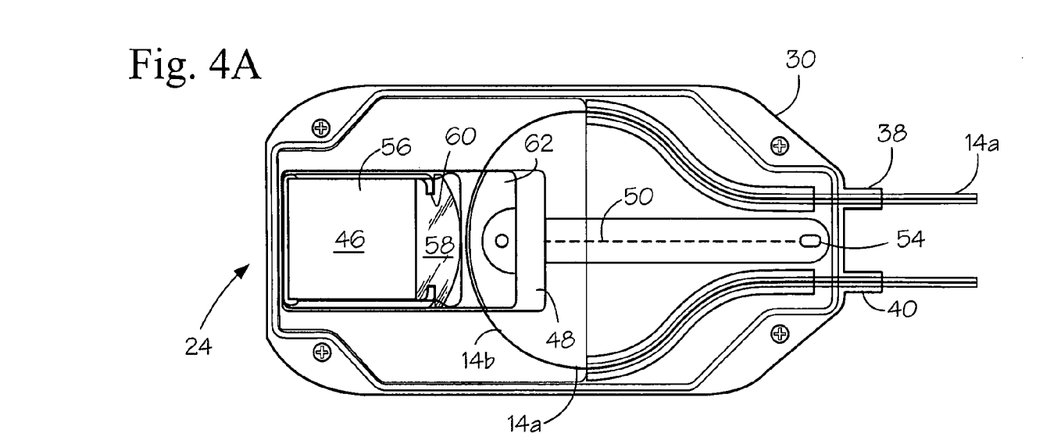
FIG. 4A is a top plan view of an optic intrusion sensor according to the invention with the cover removed and the sensor actuator in a deactivated position.
Figure 4B:
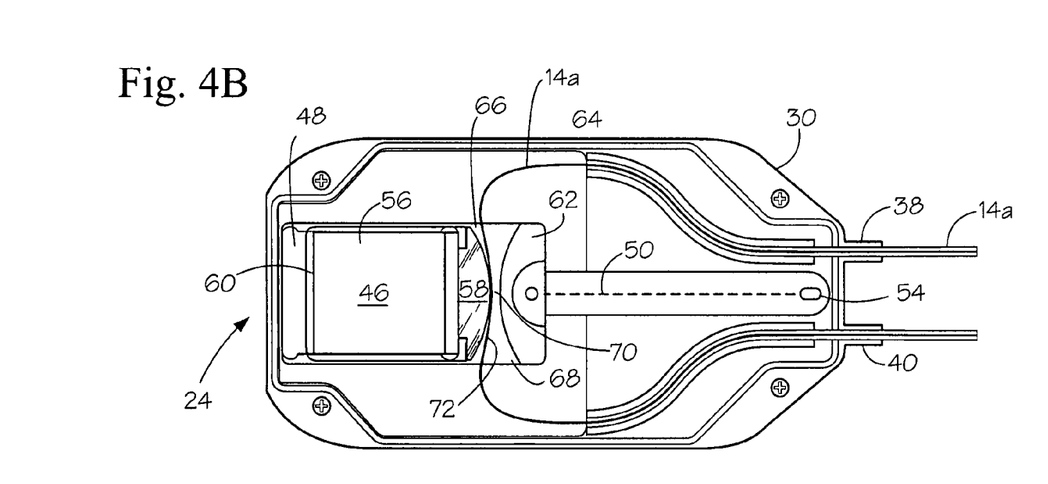
FIG. 4B is a top plan view of an optic intrusion sensor according to the invention with the cover removed and the sensor actuator in an activated position.
Figure 4C:
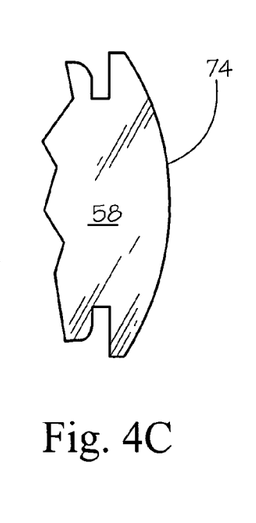
FIG. 4C is a partial view of a sensor actuator of the optic intrusion sensor illustrating a contoured surface of the actuator which produces a characteristic bend in an optic fiber used as a sensor fiber so that a characteristic signal is produced by an optical timed domain reflectometer connected to the fiber.

As can best be seen in FIGS. 4A and 4B, intrusion sensor housing 30 includes a fiber entrance 38 and a fiber exit 40. A moveable sensor actuator 46 is slidably carried within a cutout slide cavity 48. A spring 50 is attached to the sensor actuator at 52 on one end and to a post 54 affixed to housing 30 at an opposite end. In the illustrated embodiment, sensor actuator 46 includes a magnet 56 and a first arcuate abutment 58 made integral with magnet 56 by means of a clip 60. Sensor actuator 46 also includes a second arcuate abutment 62. Arcuate abutments 58, 62 define a fiber receiving space 64 therebetween. Receiving space 64 includes an entrance trumpet 66, an outlet trumpet 68, and a throat 70 therebetween. A fiber 14a which is removed from the fiber network, is routed through the sensor and the fiber receiving space. Preferably the sheath of the fiber is removed so that only the optic fiber 14a is routed through the receiving space of the sensor actuator. The sensor is illustrated in a deactivated position in FIG. 4A wherein fiber 14a is routed through the housing inlet, fiber receiving space 64, and the fiber outlet. It can be seen that the fiber passing through the fiber receiving space assumes a natural or circular curve 14b over a major portion within the sensor. In the deactivated position moveable sensor actuator 46 is maintained as shown in FIG. 4A by the magnetic force of attraction between magnet 56 and manhole cover 20 in its secured position. When the manhole cover is moved to the unsecured position, a predetermined distance from magnet 56, the magnetic attraction is broken and sensor actuator 46 moves vertically to place a predetermined bend 72 in the fiber 14a, as can best be seen in FIG. 4B. In order that a predetermined and characteristic bend is placed in the fiber that will emit a uniform signal anytime the sensor is activated, first arcuate abutment 58 includes a contour at 74. Preferably contour 74 is provided in the form of a tangential flat surface that creates a controlled radius in the bend 72 of the fiber that causes a characteristic intrusion signal shape to be received by the OTR device and displayed, e.g., see signal 90a at FIG. 5. By providing a consistent and uniform fiber bend and attenuation, the intrusion signal can be detected and recognized on the display screen of the OTR device in a reliable manner.

In the preferred embodiment, actuator 46 includes magnet 56 which is maintained in the deactivated position by proximity of sensor 24 to the metal flange of manhole cover 20. Spring 50 is tensioned when moveable actuator 46 is in the deactivated position of FIG. 4A. When the magnetic force is broken, the spring tension pulls the actuator downwards to place predetermined bend 72 in optic fiber 14a. In the event that a nonmetallic material is used for the manhole manifold and cover, a metallic material insert may be placed in an area of the manhole cover which will maintain actuator 46 in a retracted, deactivated position of FIG. 4A. The manhole cover has a secure position fitted within the top opening of the manifold, and an unsecured position when it is moved from the secured position which is sufficient to break the magnetic attraction. In order to eliminate false detections, sensor 24 is mounted a sufficient distance from the manhole cover, e.g., one-half inch, so that fluttering of the cover by traffic, etc., does not break the magnetic attraction between actuator 46 and the cover. However, when the cover is moved a sufficient, predetermined distance to an unsecured position which indicates an intrusion, the magnetic attraction is broken and sensor actuator 46 moves to the activated position of FIG. 4B whereupon optic fiber 14a is deflected changing its reflection properties and attenuation. Variations on the sensor actuator and types of sensors, may be had, although it is advantageous that there be no mechanical or direct connection between the optic signal wire used in the sensor and the moveable member needed to be moved by an intruder, and that no electrical power be required for the sensor operation.

When a characteristic intrusion signal is produced, such as 90a, 90b, or 90c, the OTR device measures the distance to the signal, or signals. The sensor locations are mapped by the processor system so that a display or printout of the sensor and its exact geographical location is produced. In this manner, the exact point of the intrusion is determined so that a timely response may be made at the location of the intrusion.

As can best be seen in FIG. 1, OTDR is connected to a computer system C having a computer processor 80 connected to a monitor 82 with a display screen 84. A normal OTDR signal 86 is transmitted from the OTDR to computer processor 80, and displayed on monitor 82. Conventional input devices, keyboard 88, and mouse 89, may be provided for operating computer system C. Of course, other means of displaying the OTDR signal may be used, such as a dedicated display device.

Figure 5:
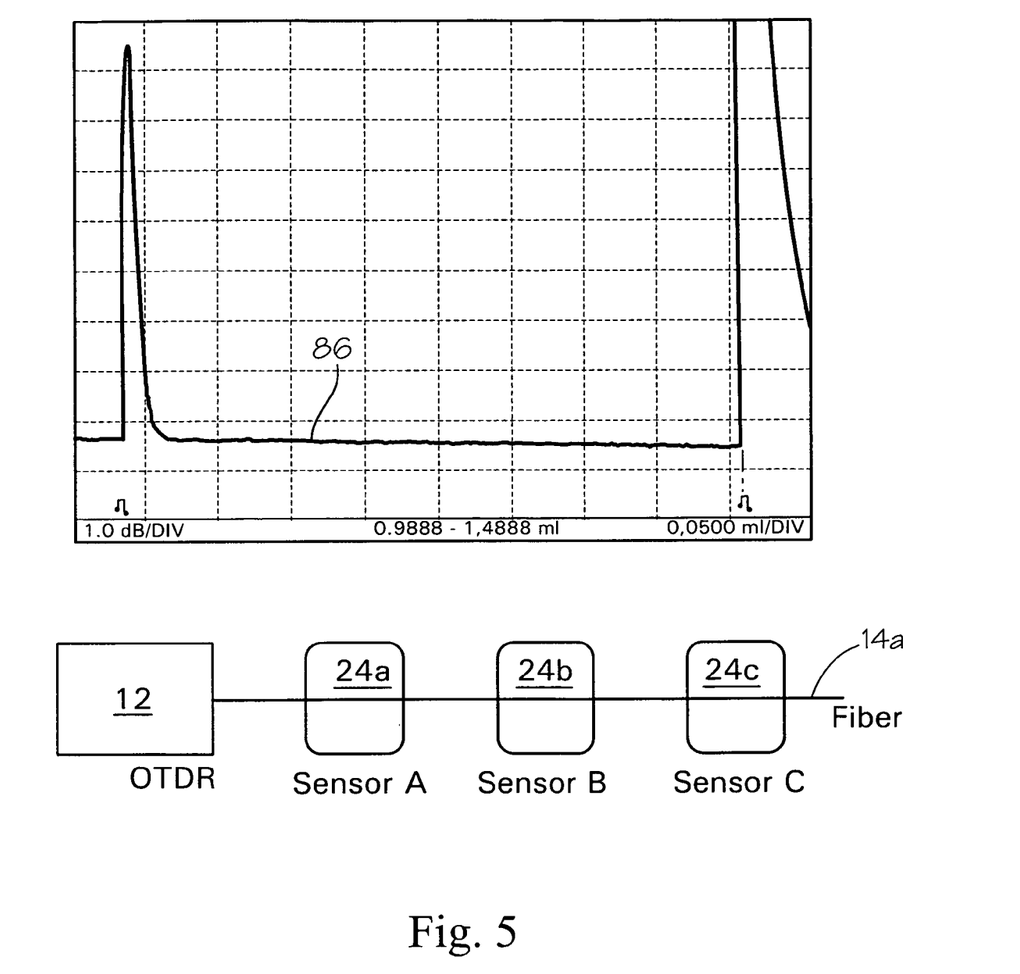
FIG. 5 is a schematic illustration of three of the intrusion sensors wired in a fiber optic network, and a graphic display of a normal OTDR signal produced when the sensors are not activated.
Figure 6:
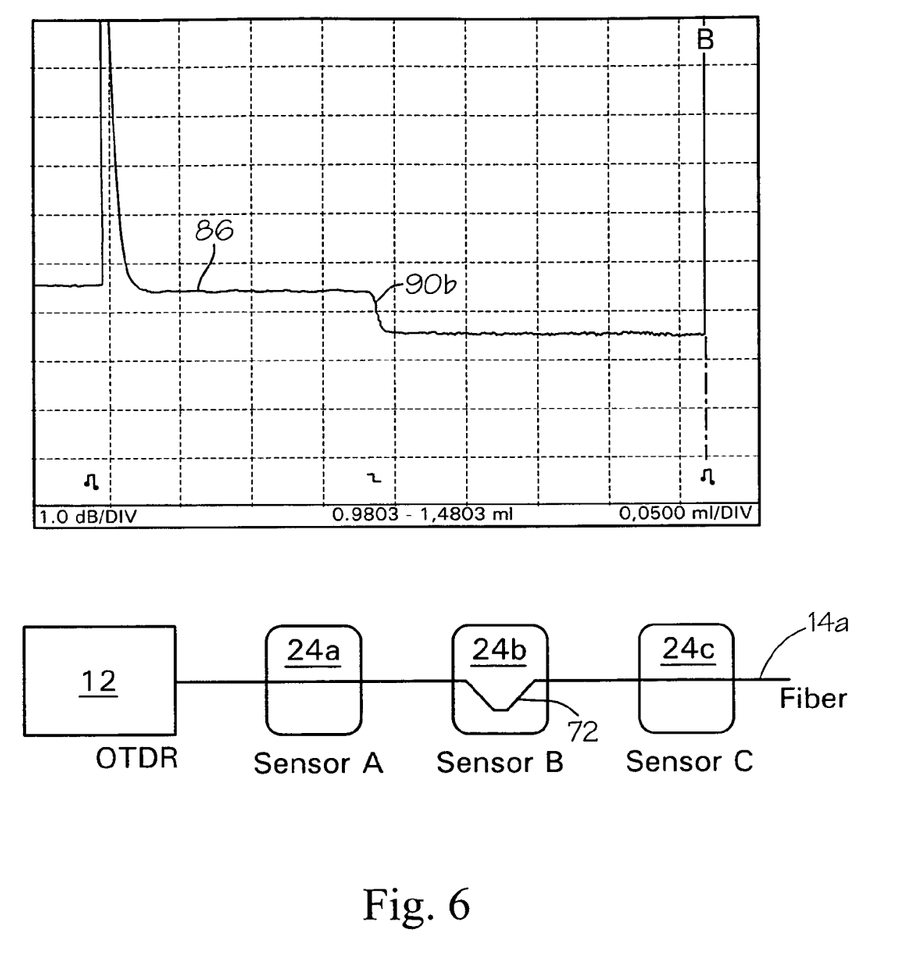
FIG. 6 is a graphic display of the OTDR signal when one sensor is activated.
Figure 7:
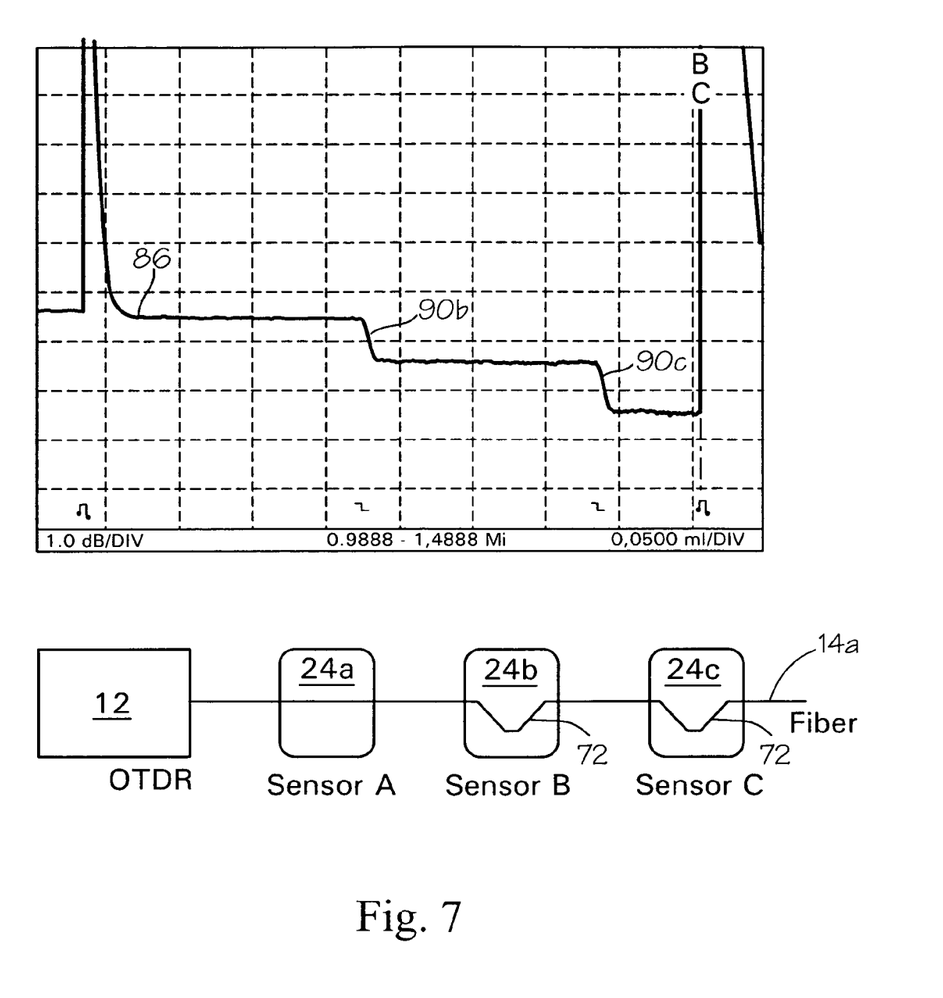
FIG. 7 is a graphic display of the OTDR signal when two of the sensors are activated.

Referring to FIGS. 5 through 8, the operation of the system and identification of activated sensors will now be discussed. FIG. 5 illustrates display screen 84 of monitor 82 displaying a normal signal 86 which is received in the absence of an OTDR intrusion event, or other fiber disturbance signal. Optic sensor fiber 14a is commonly routed through each of sensors 24a, 24b, 24c. As illustrated in FIG. 5, none of the sensors are activated so a normal signal 86 is displayed on the screen. In FIG. 6, sensor 24b is activated, and an OTDR intrusion signal 90b is displayed showing that an intrusion event has occurred at sensor 24b. Since the location of sensor 24b is known and mapped, the location of the intrusion is determinable. FIG. 7 shows the graphic display screen 60 when an instruction event has occurred at both sensor 24b and 24c, as indicated at signal 90b and 90c.

Figure 8:
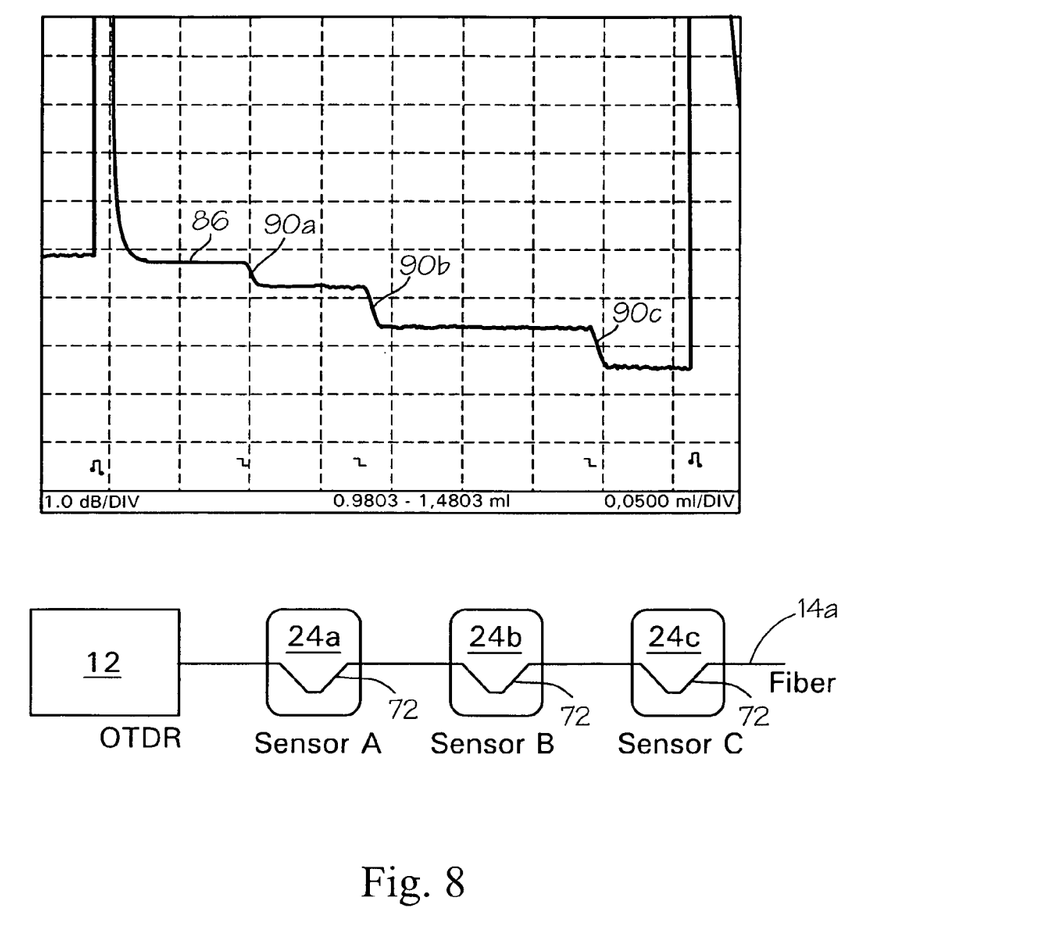
FIG. 8 is a graphic display of the OTDR signal when all three of the sensors in the optical network are activated.

FIG. 8 illustrates graphic display of OTDR signals at 90a, 90b, and 90c when an intrusion event has occurred at all three sensors 24a, 24b, and 24c. Since the locations of sensors 24a, 24b, 24c are predetermined and mapped, the location of the intrusion event is known by knowing which sensor is activated. It is noted that intrusion signals 90a, 90b, and 90c have a characteristic shape predetermined by the shape of bend 72 created in optic sensor fiber 14a by contour 74 of abutment 58. This characteristic signal shape is reliably recognized as an intrusion event signal. Typically, the OTDR will also have other characteristic signals which represent other fiber disturbances and resulting attenuation. For example, a 0.5 db power drop indicates an intrusion, a 1 db power drop indicates water seepage, a 0.3 db power drop indicates an irregular bend, a fiber breakage is represented by a straight spike, etc.

Thus, it can be seen that a highly advantageous construction for a security system and sensor can be had according to the invention where preexisting or new fiber networks can be utilized in close proximity to locations needed to be secured whereby sensors connected in series with an OTDR device can be utilized to determine the occurrence and location of an intrusion anywhere along the fiber optic network. For example, if a municipality has 1,000 miles of fiber optic network routed through tunnels accessible by manholes, each manhole may be provided with a sensor to determine whether it has been moved to an unsecured position. In this manner, the entire network of manholes and fiber optic network, as well as other underground utilities, may be secured against terrorists or other acts of invasion, vandalism, etc.

While a preferred embodiment of the invention has been described using specific terms, such description is for illustrative purposes only, and it is to be understood that changes and variations may be made without departing from the spirit or scope of the following claims.

What is claimed is:

1. A security system for detecting intrusion at a plurality of predetermined locations having movable members which must be moved in order to intrude into said location, said system comprising:
    an optic fiber sensor fiber;
    a plurality of sensors disposed at said locations contacting said optic sensor fiber, said sensors detecting movement of said moveable members and attempted physical intrusions at said locations and generating intrusion signals when one or more sensors are activated thereby;
    a processor in communication with said sensor fiber for receiving said intrusion signals from said activated sensors and determining the location of each activated sensor;
    a communication output operatively associated with said processor for communicating an identification of each activated sensor and the location of each said activated sensor; and
    said sensors being disposed adjacent said moveable members in a non-contacting manner, and said sensors detecting a predetermined movement of said moveable members from a secured position to an unsecured position whereby intrusion signals are generated without physical connection between said sensors and said moveable members.

2. The system of claim 1 wherein said sensors include magnetic attractions between said sensors and said moveable members whose interruption causes activation of said sensors and generation of said intrusion signals.

3. The system of claim 2 wherein said sensors include a reciprocating sensor actuator having a deactivated position and an activated position, said sensor actuator engaging said sensor fiber when said moveable members are in an unsecured position causing sensor activation and said intrusion signal to be generated.

4. The system of claim 3 wherein said reciprocating sensor actuator forms a predetermined bend in said sensor fiber when activated to produce a characteristic intrusion signal that is readily recognizable by said processor to reliably detect a sensor activation and sensor location.

5. The system of claim 4 wherein said sensor actuator includes a first contoured abutment with a prescribed contour for engaging said sensor fiber, and said prescribed contour producing said predetermined bend in said sensor fiber upon activation of said sensor.

6. The system of claim 5 wherein said sensor includes a sensor housing having a fiber chamber, said sensor fiber being routed through said fiber chamber with a natural bend producing no attenuation in said sensor fiber when said sensor is deactivated, and said sensor actuator engaging said natural bend of said sensor fiber to form said predetermined bend in said sensor fiber when said sensor is activated causing attenuation in said sensor fiber and generation of said intrusion signal.

7. The system of claim 6 wherein said fiber chamber includes a fiber receiving space defined between said first contoured abutment of said sensor actuator and a second contoured abutment through which said sensor fiber passes.

8. The system of claim 7 wherein said second contoured abutment engages said sensor fiber to produce said natural bend when said sensor is deactivated, and said first contoured abutment engages said sensor fiber to produce said predetermined bend when said sensor is activated.

9. The system of claim 8 wherein said first and second contoured abutments are carried by said movable actuator.

10. The system of claim 9 including a biasing element connected between said movable actuator and said sensor housing which forces said first contoured abutment into engagement with said sensor fiber when said sensor is activated.

11. The system of claim 6 wherein said sensor housing includes a fiber inlet and a fiber outlet so that said sensor fiber is routed through said inlet, through said fiber chamber where said sensor fiber assumes said natural bend, and through said fiber outlet.

12. A security system for detecting intrusion at one or more predetermined locations wherein each location includes a moveable member which must be moved in order to intrude into said location, said system comprising:
    an optic sensor fiber routed in proximity to said one or more locations;
    a sensor disposed at each of said one or more locations for detecting a predetermined movement of said moveable member to an unsecured position at one or more locations;
    said sensor fiber being physically associated with each said sensor;
    said sensor being mounted in a stationary position at each said location without a mechanical connection to said moveable member;
    said sensor generating an intrusion signal upon detecting said predetermined movement of the moveable member at said one or more locations, said intrusion signal being transmitted along said sensor fiber;
    a processor in communication with said sensor fiber receiving said intrusion signal for determining the location of an activated sensor; and
    communication output providing information of an activation and location of said sensor at said one or more locations in response to said processor receiving said intrusion signal.

13. The system of claim 12 wherein said sensors include magnetic attractions between said sensors and said moveable members whose interruption causes activation of said sensors and generation of said intrusion signal.

14. The system of claim 12 wherein said sensors include moveable sensor actuators having a deactivated position and an activated position, said sensor actuator engaging said sensor fiber when said moveable members are in an unsecured position causing sensor activation and said intrusion signal to be generated.

15. The system of claim 14 wherein said moveable sensor actuator forms a predetermined bend in said sensor fiber when activated to produce a characteristic intrusion signal that is readily recognizable by said processor to reliably detect a sensor activation and sensor location.

16. The system of claim 14 wherein said sensor includes a sensor housing having a fiber chamber, said optic sensor fiber being routed through said fiber chamber with a natural bend producing no attenuation in said sensor fiber when said sensor is deactivated, and said sensor actuator engaging said natural bend of said sensor fiber to form said predetermined bend in said sensor fiber when said sensor is activated causing attenuation in said sensor fiber and generation of said intrusion signal.

17. The system of claim 16 wherein said fiber chamber includes a fiber receiving space defined between said first contoured abutment of said sensor actuator and a second contoured abutment between which said sensor fiber passes.

18. The system of claim 17 wherein said second contoured abutment engages said sensor fiber to produce said natural bend when said sensor is deactivated, and said first contoured abutment engages said sensor fiber to produce said predetermined bend when said sensor is activated.

19. The system of claim 18 wherein said sensor housing includes a fiber inlet and a fiber outlet so that said sensor fiber is routed through said inlet, through said fiber chamber where said sensor fiber assumes said natural bend, and through said fiber outlet.

20. A sensor for a security system detecting intrusions at one or more predetermined locations wherein each location includes a moveable member which must be moved in order to intrude said location, and an optic sensor fiber routed in close proximity to said one or more locations, said sensor comprising:
a sensor housing for being disposed at a location to detect a predetermined movement of said moveable member from a secure position to an unsecured position;
means for mounting said sensor housing in a stationary position at said location without a physical connection to said moveable member;
a fiber inlet and a fiber outlet formed in said housing;
a fiber chamber in said housing for receiving said sensor fiber routed through said sensor housing; and
said sensor having a sensor actuator for generating an intrusion signal upon detecting said predetermined movement of the moveable member at a location causing said intrusion signal to be transmitted along said fiber of said fiber network to a processor;
whereby the intrusion and location of the intrusion are may be determined by said processor.

21. The system of claim 20 wherein said sensor includes a magnetic actuator having a magnetic attraction to said moveable members whose interruption causes activation of said sensor and generation of said intrusion signal.

22. The system of claim 20 wherein said sensor includes a moveable sensor actuator having a deactivated position and an activated position, said sensor actuator engaging said sensor fiber when said moveable member is in an unsecured position causing sensor activation and said intrusion signal to be generated.

23. The system of claim 22 wherein said moveable sensor actuator forms a predetermined bend in said sensor fiber when activated to produce a characteristic intrusion signal that is readily recognizable by said processor to reliably detect a sensor activation and sensor location.

24. The system of claim 23 wherein said fiber chamber is constructed to receive said sensor fiber when routed through said fiber chamber with a natural bend producing no attenuation in said sensor fiber when said sensor is deactivated, and said sensor actuator engaging said natural bend of said sensor fiber to form said predetermined bend in said sensor fiber when said sensor is activated causing attenuation in said sensor fiber and generation of said intrusion signal.

25. The system of claim 24 wherein said fiber chamber includes a fiber receiving space defined between said first contoured abutment of said sensor actuator and a second contoured abutment between which said sensor fiber passes.

26. The system of claim 25 wherein said second contoured abutment engages said sensor fiber to produce said natural bend when said sensor is deactivated, and said first contoured abutment engages said sensor fiber to produce said predetermined bend when said sensor is activated.

27. The system of claim 26 wherein said first and second contoured abutments are carried by said movable actuator.

28. The system of claim 27 including a biasing element connected between said movable actuator and said sensor housing which forces said first contoured abutment into engagement with said sensor fiber when said sensor is activated.

29. A method for detecting intrusion into a protected location using an optic sensor fiber connected to an optical reflectometer processor, said method comprising:
providing a sensor for detecting a predetermined movement of a moveable member which must be moved in order to intrude into said location;
providing a connection between said sensor fiber and said sensor so that a predetermined movement of said moveable member causes said sensor to be activated and to generate an intrusion signal which is transmitted to said reflectometer processor through said fiber; and
processing said intrusion signal to determine location of said sensor.

30. The method of claim 29 including using an existing utility fiber network carrying at least one of voice and data signals, and providing connection to a fiber of said fiber network as a sensor fiber for generating and transmitting said intrusion signal.

31. The method of claim 30 including providing said connection between said fiber and said sensor without making a physical connection between said fiber and said moveable member.

32. The method of claim 31 including providing a sensor having a moveable actuator which contacts said fiber causing generation of said intrusion signal in response to movement of said moveable member to said unsecured position.

33. The method of claim 32 including providing a magnetic attraction between said moveable actuator and said moveable member which is broken when said moveable member is moved to said unsecured position.

34. The method of claim 29 including arranging said fiber to have a natural bend producing generally no attenuation when said sensor is deactivated, and deforming said natural bend to a predetermined bend when said sensor is activated to generate said intrusion signal having a discernible characteristic wave form.

* * * * *